United States Patent [19]

Chen

[11] Patent Number: 5,423,434
[45] Date of Patent: Jun. 13, 1995

[54] ADJUSTABLE DISK SHOW RACK

[76] Inventor: Franks Chen, 2F, No. 53, Tzu Chang 2nd St., Lin Kou Shiang, Taipei Hsien, Taiwan, Prov. of China

[21] Appl. No.: 257,747

[22] Filed: Jun. 9, 1994

[51] Int. Cl.6 ............................................. A47G 29/00
[52] U.S. Cl. ........................................ 211/40; 211/41; 211/163; 206/309; 312/9.58; D6/407
[58] Field of Search ................... 211/40, 41, 163, 144, 211/129; 206/309, 387; 312/9.58, 9.63, 9.64, 9.59; D6/407, 457, 627, 628, 629, 630

[56] References Cited

U.S. PATENT DOCUMENTS

| D. 156,256 | 11/1949 | Kivett | D80/9 |
| D. 351,513 | 10/1994 | Kreppein | D6/407 |
| 1,004,281 | 9/1911 | Kuhn | 211/40 |
| 1,429,339 | 9/1922 | Greer | 312/9.58 |
| 2,763,524 | 9/1956 | Beers | 312/13 |
| 3,102,635 | 9/1963 | Werwin et al. | 206/62 |
| 4,560,078 | 12/1985 | Dubuisson | 220/4 |
| 4,875,743 | 10/1989 | Gelardi et al. | 312/13 |
| 5,099,995 | 3/1992 | Karakane et al. | 206/444 |
| 5,344,028 | 9/1994 | Angele | 211/40 |

FOREIGN PATENT DOCUMENTS

| 1221877 | 1/1960 | France | 211/40 |
| 718084 | 2/1980 | U.S.S.R. | 312/9.58 |

Primary Examiner—Leslie A. Braun
Assistant Examiner—Catherine S. Collins
Attorney, Agent, or Firm—Browdy and Neimark

[57] ABSTRACT

An adjustable disk show rack including a plurality of individual sector boxes pivotally connected together by a pivot shaft, each individual sector box having a horizontal insertion slot on the arc for the insertion of an individual laser disk, a first rail and a first sliding groove disposed at the bottom and concentrically spaced along the arc, a second sliding groove and a second rail disposed at the top and concentrically spaced along the arc corresponding to the first rail and the first sliding groove, and wherein the first rail and first sliding groove of one individual sector box are slidably matched with the second sliding groove and second rail of another individual sector box so that the individual sector boxes can be arranged into a stack or spread out like a fan.

6 Claims, 7 Drawing Sheets

ADJUSTABLE DISK SHOW RACK

BACKGROUND OF THE INVENTION

The present invention relates to a disk show rack comprised of a plurality of sector boxes pivotally connected to a pivot shaft at different elevations for keeping laser disks.

Regular laser disk storage devices or show racks are commonly comprised of a fixed frame construction divided into a plurality of storage chambers for carrying individual laser disks. Because of fixed type, one must open the cover of the rack and/or pull the individual laser disks out of the storage chambers for checking while searching specific individual laser disks.

SUMMARY OF THE INVENTION

The present invention provides a laser disk show rack which eliminates the aforesaid drawbacks. According to one aspect of the present invention, the laser disk show rack is comprised of a plurality of individual sector boxes pivotally connected together by a pivot shaft for carrying individual laser disks. By means of matching the rail and sliding groove on the bottom of one individual sector box with the sliding groove and rail on the top of another individual sector box, the individual sector boxes of the laser disk show rack can be arranged into a stack or spread out like a fan. According to another aspect of the present invention, the individual sector boxes can be pivotally mounted on the upright support of a table lamp and arranged into a stack or spread out like a fan.

DETAILED DESCRIPTION OF THE PREFERRED EMBODIMENT

Figure 1:
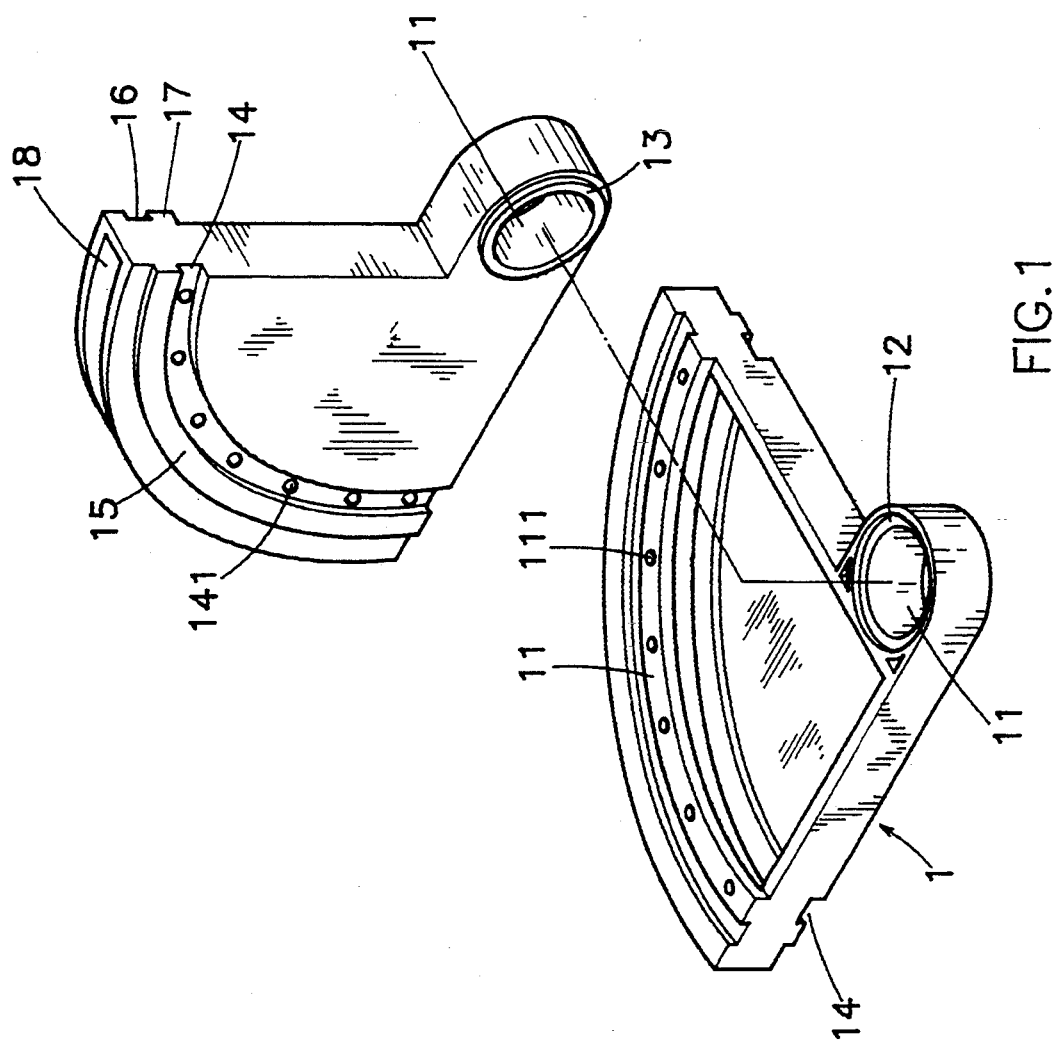
FIG. 1 is a dismantled view of an adjustable disk show rack according to the present invention.
Figure 2:
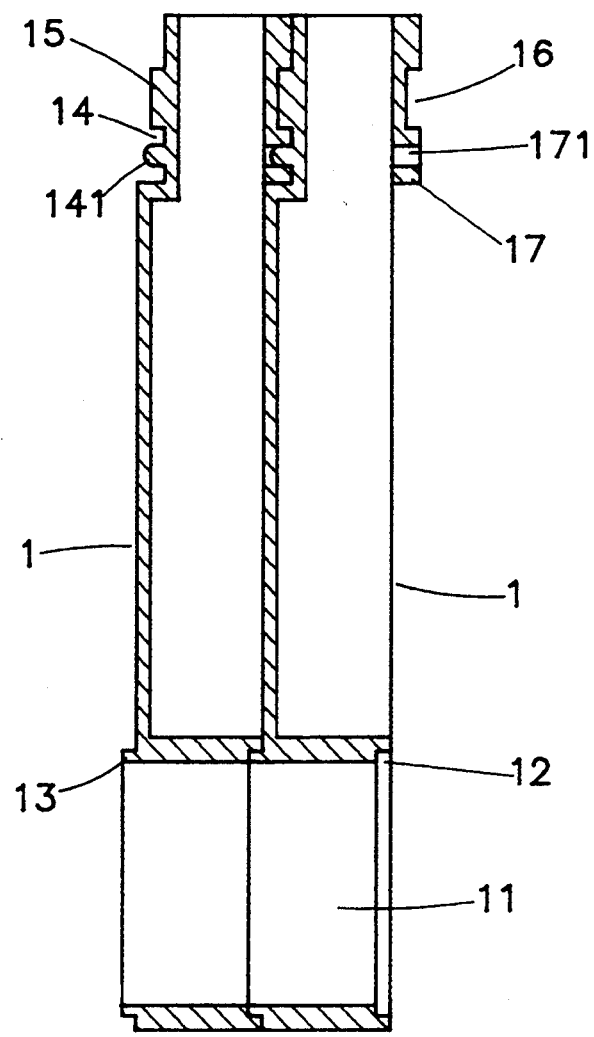
FIG. 2 is a sectional view showing two individual Sector boxes coupled together.
Figure 5:
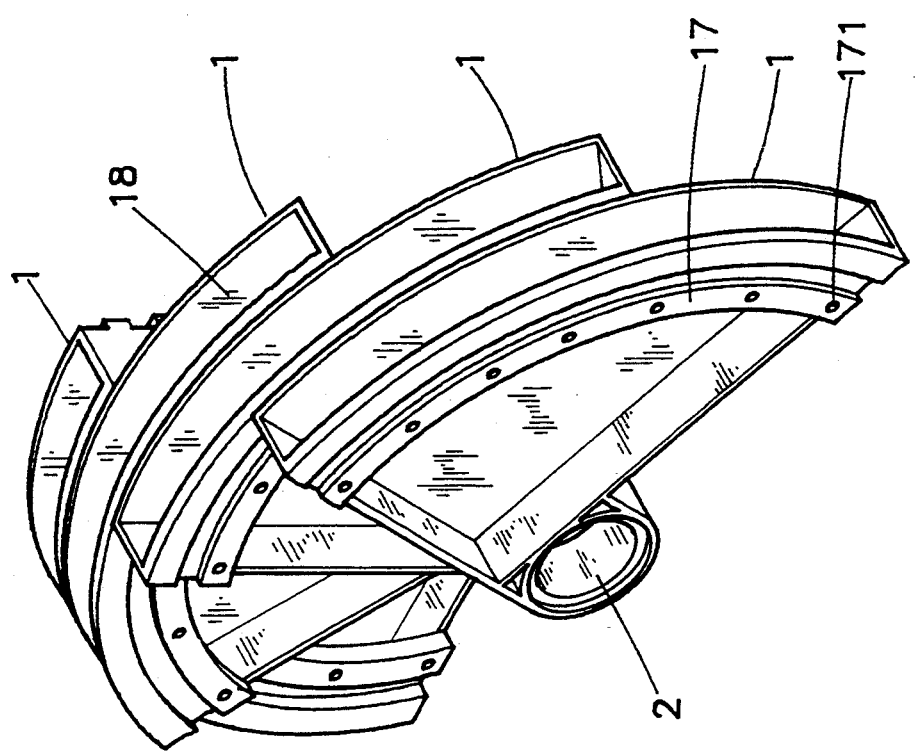
FIG. 5 is an elevational view of a disk show rack according to the present invention.

Referring to FIGS. 1, 2, and 5, an adjustable disk show rack in accordance with the present invention is generally comprised of a plurality of individual sector boxes 1 pivotally connected together at different elevations. The individual sector box 1 is shaped like a sector having a horizontal insertion slot 18 on the arc, a vertical axle hole 11 at the point, an annular groove 12 and an annular flange 13 around the axle hole 11 at two opposite ends, a first rail 15 and a first sliding groove 14 disposed at the bottom and concentrically spaced along the arch, a second sliding groove 16 and a second rail 17 disposed at the top and concentrically spaced along the arc corresponding to the first rail 15 and the first sliding groove 14. A plurality of raised portions 141 and a plurality of recessed portions 171 are respectively made on the first sliding groove 14 and the second rail 17. By fitting the annular flange 13 of one individual sector box 1 into the annular groove 12 of another and matching the first rail 15 and first sliding groove 14 of one individual sector box 1 with the second sliding groove 16 and second rail 17 of another, a plurality of individual sector boxes 1 are pivotally connected together at different elevations. When a plurality of individual sector boxes 1 are pivotally connected together, a pivot shaft 2 may be inserted into the axle holes 11 of the individual sector boxes 1 to secure the connection. When assembled, the individual sector boxes 1 can be arranged into a stack or spread out like a fan (see FIG. 5), and individual laser disks can be respectively inserted into the sector boxes 1 through the insertion slot 18 on each sector box 1. By engaging the raised portions 171 on one individual sector box 1 into the recessed portions 141 on another, the individual sector boxes 1 are positioned one above another.

Figure 3:
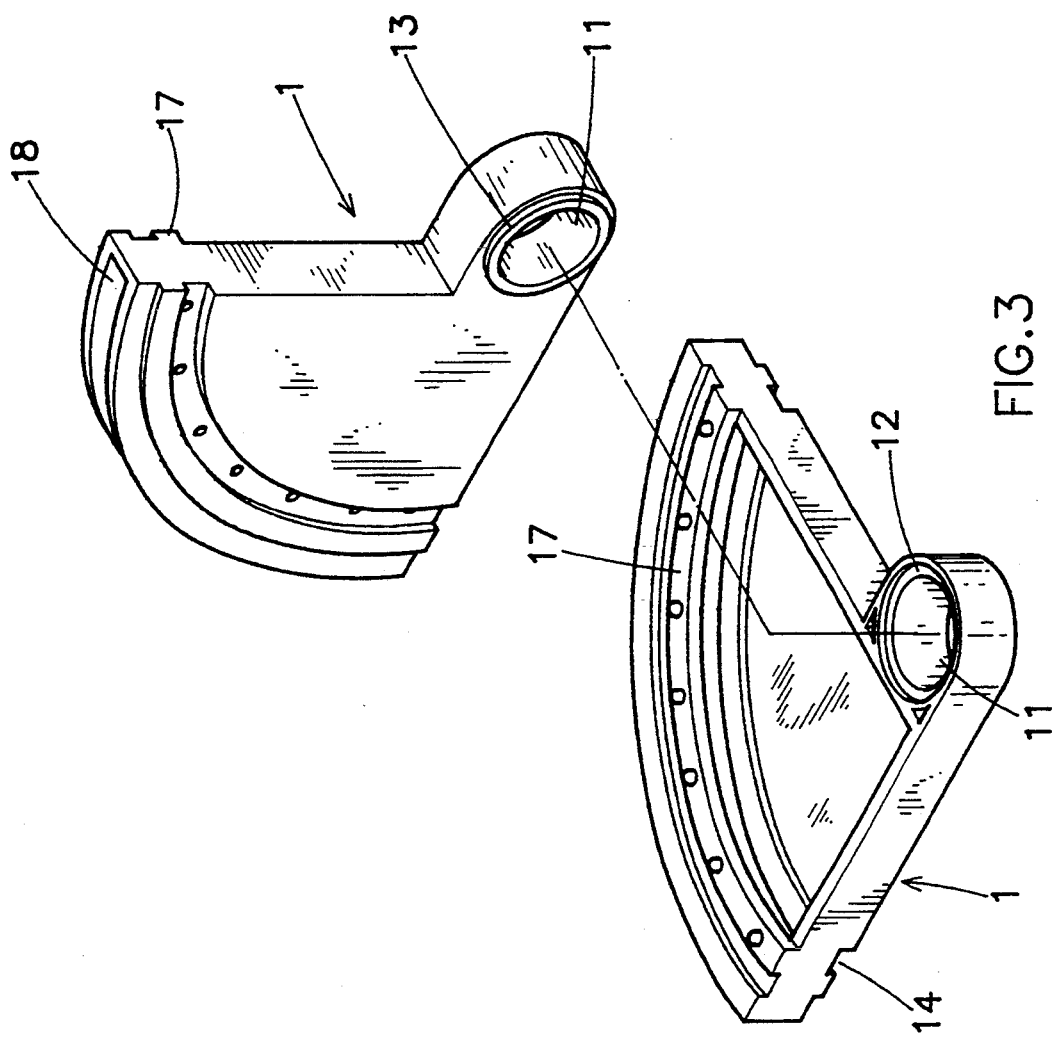
FIG. 3 shows an alternate form of the individual sector box according to the present invention.

Referring to FIG. 3, therein illustrated is an alternate form of the individual sector box 1. According to this alternate form, the second rail 17 has a plurality of raised portions and the first sliding groove 14 has a plurality of recessed portions for matching with the raised portions on the second rail 17 of another individual sector box 1.

Figure 4:
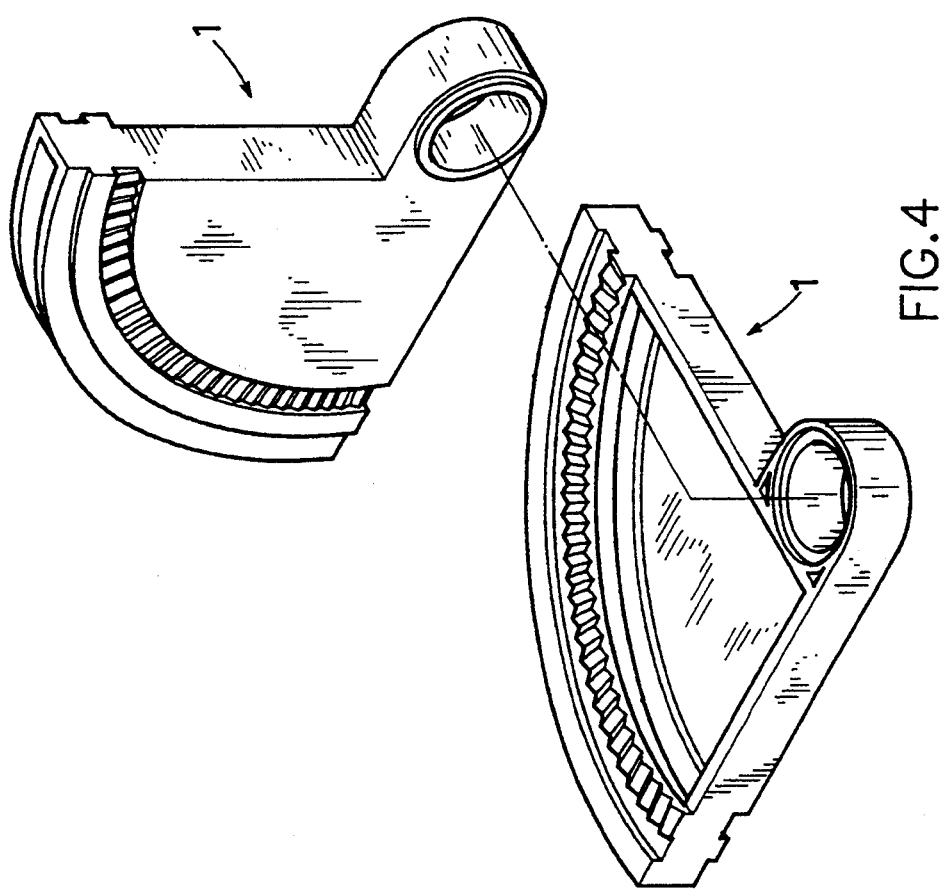
FIG. 4 shows another alternate form of the individual sector box according to the present invention.

Referring to FIG. 4, therein illustrated is still another alternate form of the individual sector box 1. According to this alternate form, the first sliding groove 14 and the second rail 17 are made having a respective series of teeth at the top for positioning.

Figure 6:
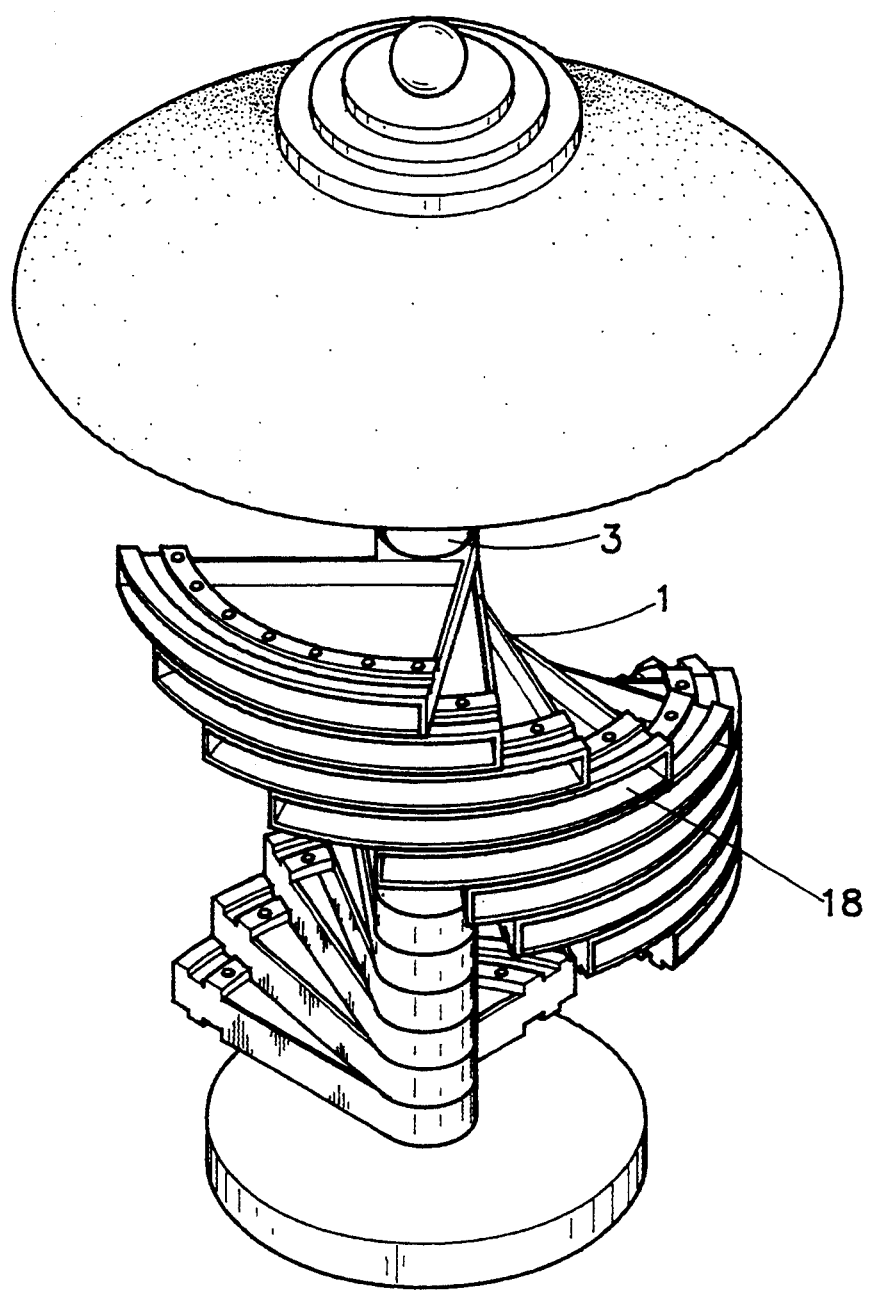
FIG. 6 shows a disk show rack of the present invention mounted on the upright support of a table lamp.
Figure 7:
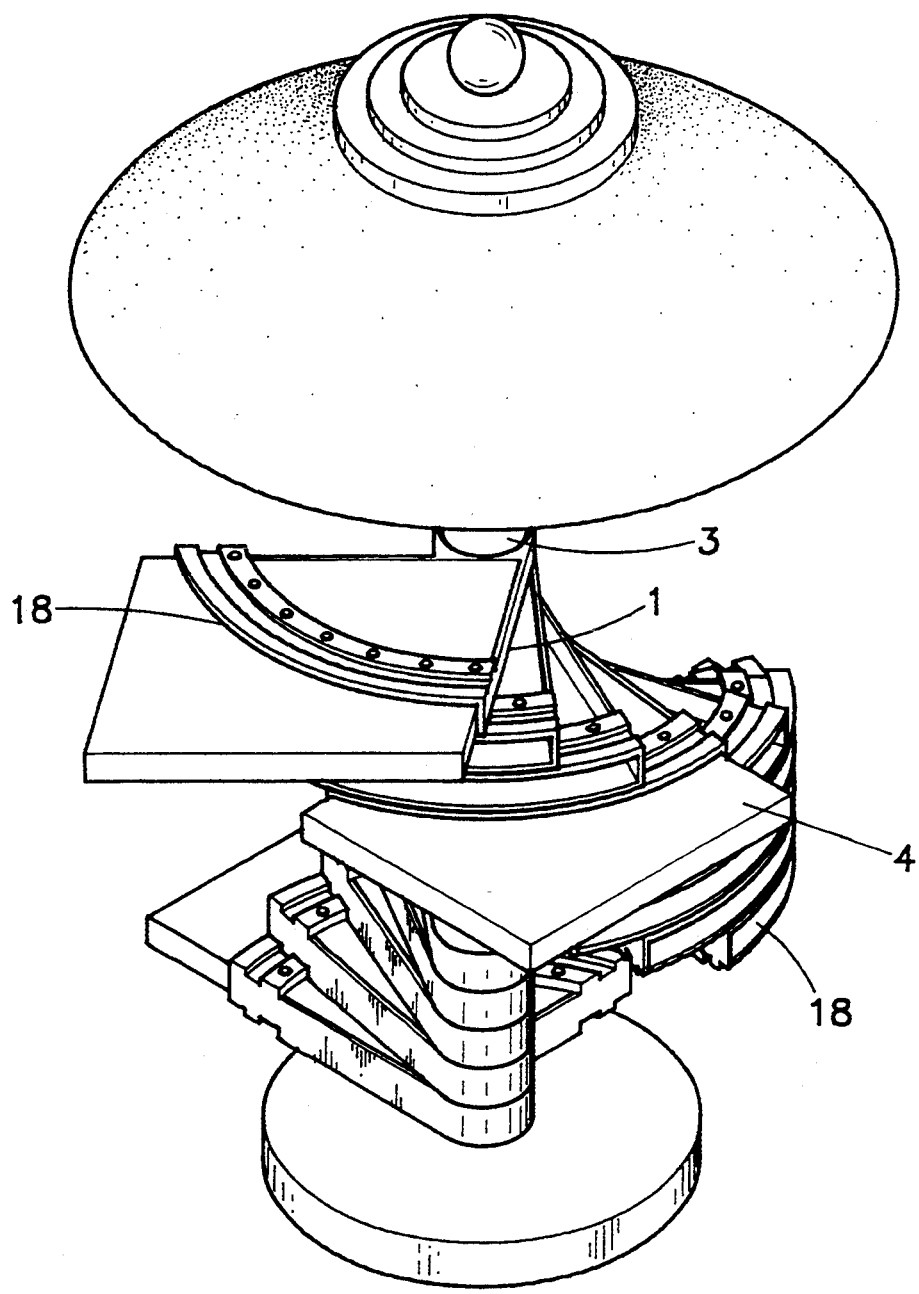
FIG. 7 is similar to FIG. 4 but showing individual laser disks respectively put in the individual sector boxes.

Referring to FIGS. 5 and 6, the present invention may be coupled to a table lamp by inserting the upright support 3 of the table lamp through the axle holes 11 of the individual sector boxes 1. When installed, individual laser disks 4 can be respectively inserted into the insertion slot 18 on each individual sector box 1.

While only few embodiments of the present invention have been shown and described, it will be understood that various modifications and changes could be made without departing from the spirit and scope of the invention.

What is claimed is:

1. An adjustable disk show rack comprising a plurality of individual sector boxes pivotally connected together for carrying individual laser disks, each individual sector box comprising a horizontal insertion slot on an arched front wall thereof for the insertion of an individual laser disk, a vertical axle hole at a rear end thereof, an annular groove and an annular flange around two opposite ends of said axle hole, a first rail and a first sliding groove disposed at a bottom and concentrically spaced along said arched front wall, a second sliding groove and a second rail disposed at a top and concentrically spaced along said arched front wall corresponding to said first rail and said first sliding groove, and wherein the annular flange of one individual sector box is fitted into the annular groove of another individual sector box with the first rail and first sliding groove of one individual sector box slidably matched with the second sliding groove and second rail of another individual sector box, so that said individual sector boxes can be arranged into a stack and spread out like a fan.

2. The adjustable disk show rack of claim 1 further comprising a pivot shaft inserted through the axle holes of said individual sector boxes.

3. The adjustable disk show rack of claim 1 wherein each individual sector box further comprises a plurality of recessed portions and a plurality of raised portions respectively made on the first sliding groove and second rail thereof so that the raised portions on the second rail of one individual sector box can be engaged into the recessed portions on the first sliding groove of another individual sector box for positioning.

4. The adjustable disk show rack of claim 1 wherein each individual sector box further comprises a plurality of raised portions and a plurality of recessed portions respectively made on the first sliding groove and second rail thereof so that the raised portions on the first sliding groove of one individual sector box can be engaged into the recessed portions on the second rail of another individual sector box for positioning.

5. The adjustable disk show rack of claim 1 wherein the first sliding groove and second rail of each individual sector box have a respective toothed portion so that the toothed portion of the first sliding groove of one individual sector box can be meshed with the toothed portion of the second rail of another individual sector box for positioning.

6. The adjustable disk show rack of claim 2 wherein said pivot shaft is the upright support of a table lamp.

* * * * *